Figure 1A:
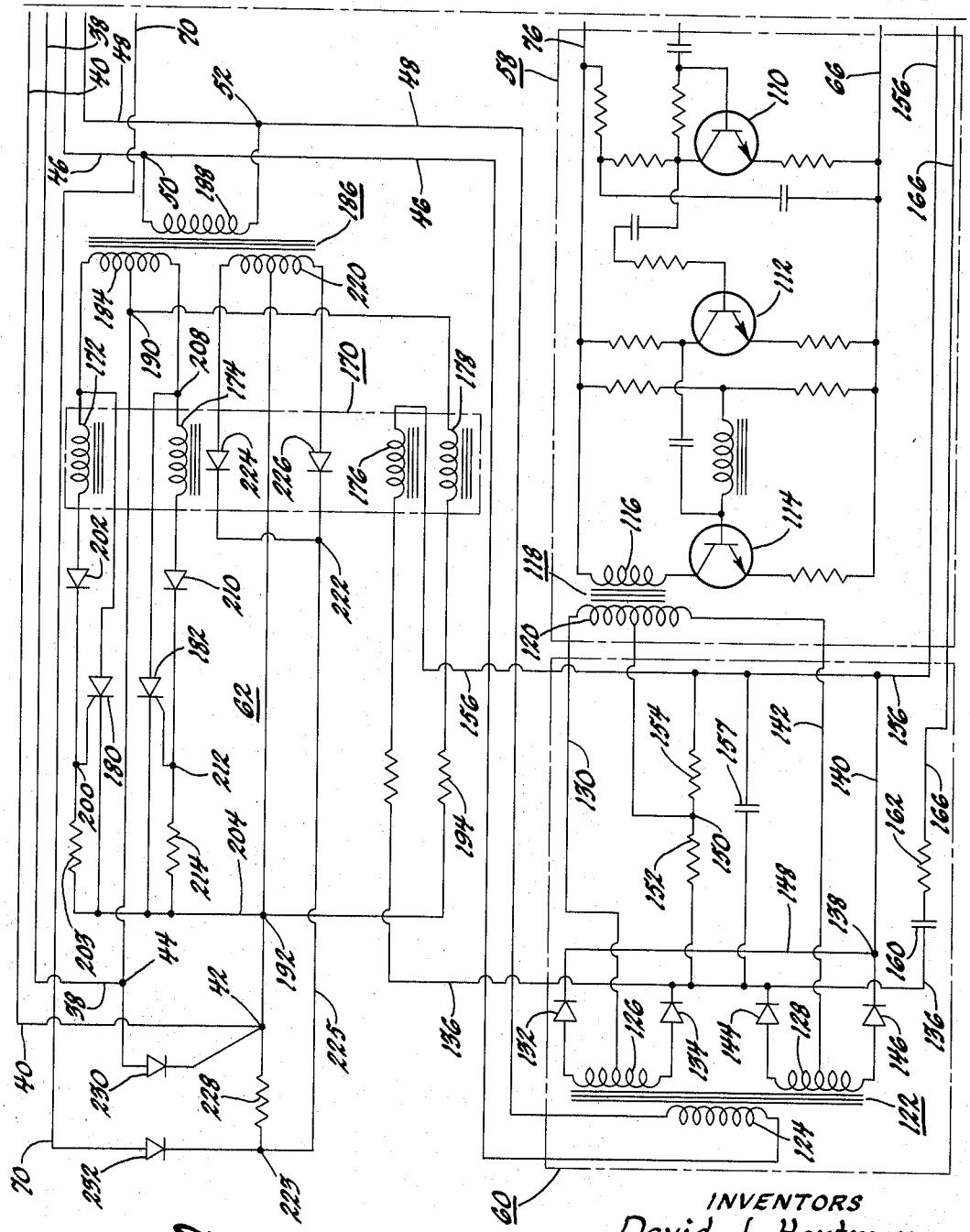

INVENTORS
David J. Hartman
Gerald A. Rath
Carl L. Van Sickle
BY
C. R. Meland
THEIR ATTORNEY United States Patent Office 3,249,847
Patented May 3, 1966

3,249,847
SEMICONDUCTOR VOLTAGE REGULATOR
David J. Hartman, Gerald A. Rath, and Carl L. Van Sickle, Anderson, Ind., assignors to General Motors Corporation, Detroit, Mich., a corporation of Delaware
Filed Sept. 14, 1962, Ser. No. 223,747
6 Claims. (Cl. 322—36)

This invention relates to voltage regulators and more particularly to voltage regulators for regulating the output voltage of a generator.

In certain modern combat vehicles, such as tanks, a generator supplies electrical power to various electrical loads. These electrical loads frequently take the form of semiconductors that cannot tolerate prolonged overvoltages. As a result, it is imperative in electrical systems for this type of vehicle that the output voltage of the generator be maintained within limits and that fail-safe provisions be made such that a failure of the voltage regulator will not cause the generator output to become uncontrolled and ruin equipment that is sometimes worth hundreds of times the cost of the regulator.

It accordingly is one of the objects of this invention to provide a voltage regulator for a generator which has a fail-safe circuit designed such that if certain components of the regulator fail the generator will not go out of control.

A more specific object of this invention is to use the A.C. output of the generator to control the field current of the generator and to use semiconductors such as silicon controlled rectifiers in the field circuit. With this arrangement, if the silicon controlled rectifier fails by shorting, it conducts A.C. current into the field and there therefore is no generator output current. On the other hand, if the silicon controlled rectifier fails due to an open, no A.C. or D.C. current is applied to the field winding and there therefore is no output voltage.

Another object of this invention is to provide a semiconductor voltage regulator which has a low level amplifier which is also provided with fail-safe features. In this regard there are no resistive coupled D.C. amplifiers used because the output with such an arrangement can either go full "on" or "off" depending on where the failure occurs. Instead of using resistive coupled D.C. amplifiers, the voltage regulator of this invention uses a chopper type input circuit and an A.C. amplifier and demodulator. The amplifier has a zero output for any type of failure of an amplifying element such as a transistor. In addition, this circuitry is highly adaptable to compensation networks between the demodulator and the D.C. input to the chopper circuit.

Still another object of this invention is to provide a voltage regulator for a type of a generator which has an integral exciter and rotating diodes for feeding the field winding of the main generator from the output winding of the exciter generator, the regulator including fail-safe features which will not permit the output voltage of the main generator to become excessive due to a failure in the regulator.

Still another object of this invention is to provide a system for initially energizing the field winding of a generator from a source of D.C. potential wherein the current from the source of D.C. potential is opposed by a voltage developed by the generator when the generator has built up to its rated output voltage. With this arrangement the source of D.C. power may be a battery which initially energizes the field circuit and the current from the battery is then opposed by an output voltage developed by the generator. If the current from the battery were not opposed, the regulator would lose control of the output voltage at high speeds and light loads. In this arrangement the A.C. output voltage of the generator is always available but is never quite high enough to give output into the D.C. system unless the regulator is also supplying field current.

Further objects and advantages of the present invention will be apparent from the following description, reference being had to the accompanying drawing wherein a preferred embodiment of the present invention is clearly shown.

Figure 1B:
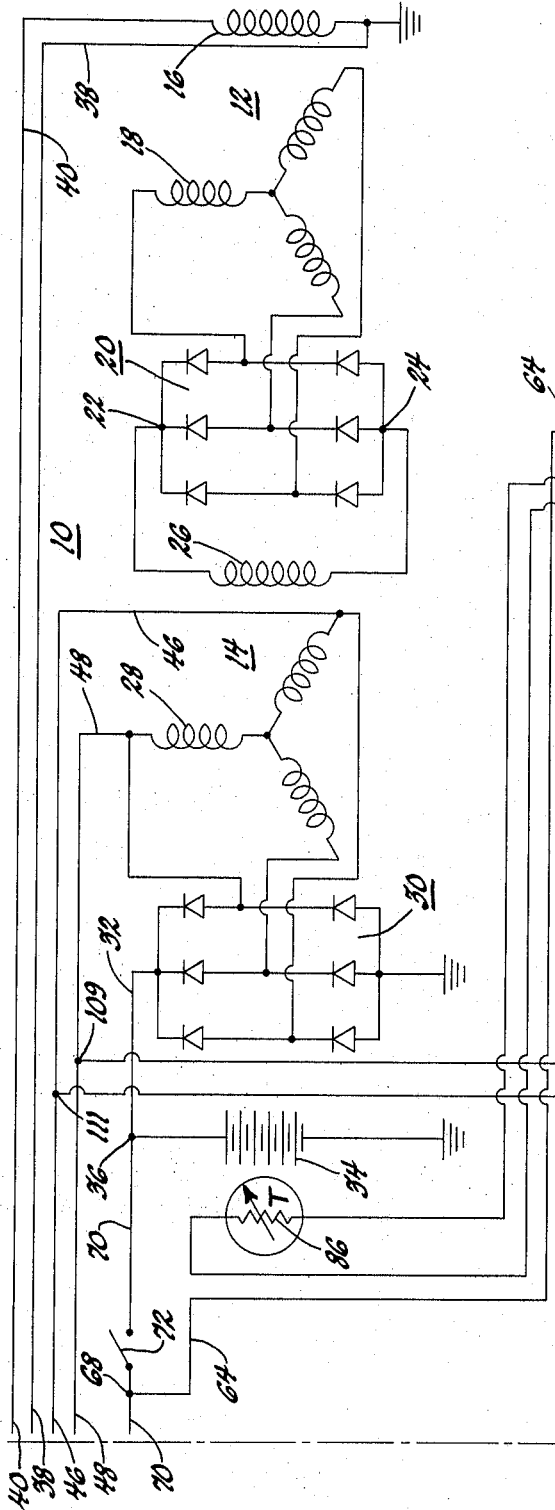
Figure 1B:
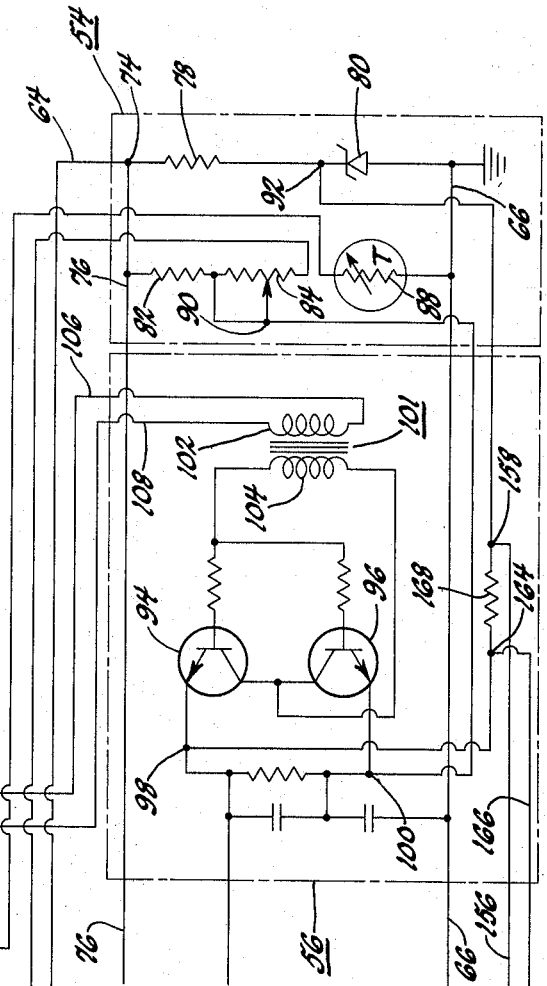

In the drawing:

FIGURES 1A and 1B when taken together are a complete schematic circuit diagram of a voltage regulator made in accordance with this invention.

Referring now to the drawings, the reference numeral 10 generally designates a generator or dynamoelectric machine which is to be regulated by the voltage regulator of this invention. The dynamoelectric machine 10 is comprised of an exciter generator 12 and a main power generator 14. The exciter generator 12 has a fixed field winding 16 and a rotatable three-phase, Y-connected output winding 18. The output winding 18 feeds a three-phase full wave bridge rectifier network 20 which has D.C. output terminals 22 and 24. The D.C. output terminals 22 and 24 feed a rotatable field winding 26 of the main generator 14. The main generator 14 has a fixed three-phase, Y-connected output winding 28 which feeds a three-phase full wave rectifier network 30. One of the D.C. terminals of the bridge rectifier network 30 is grounded whereas the other D.C. terminal is connected with a lead wire 32.

The dynamoelectric machine 10 can be of a type wherein the bridge rectifiers 20, the output winding 18 and the field winding 26 are all rotatable together and rotate with a common shaft. The field winding 16 is fixed with respect to the output winding 18 and the output winding 28 is fixed with respect to the rotatable field winding 26. The bridge rectifier 30 is fixed and supplies direct current to the loads on a motor vehicle which may include a battery 34 connected with junction 36. The dynamoelectric machine 10 may have an output in the neighborhood of 400 amps at 28 volts taken off the D.C. terminals of the bridge rectifier 30. It will be appreciated that the output voltage appearing across the D.C. terminals of the bridge rectifier 30 is controlled by controlling the field current of the field winding 16 of the exciter generator. Thus, as the field current of field winding 16 is increased, the output voltage of winding 18 is increased providing a greater output voltage from the D.C. terminals of bridge rectifier 20 and an increased field current for field winding 26. This, of course, causes the output voltage of output winding 28 to increase with a consequent increase in the output voltage from bridge rectifier 30. The regulator which is to be more fully described hereinafter maintains this output voltage at substantially 28 volts D.C.

It can be seen from the drawing that one side of the field winding 16 is grounded and that this side is also connected with a lead wire 38. The opposite side of field winding 16 is connected with lead wire 40. The lead wire 40 is connected to the voltage regulator at junction 42 whereas the lead wire 38 is connected with the junction 44 of the regulator. As will become more readily apparent hereinafter, the junctions 42 and 44 feed a controlled direct current to the field winding 16 and this current is a function of the output voltage of the bridge rectifier 30.

One phase of the output winding 28 is connected with lead wires 46 and 48. The lead wire 46 is connected with a junction 50 whereas the lead wire 48 is connected with junction 52. The junctions 50 and 52 form A.C. input terminals for the voltage regulator and are more fully described hereinafter.

The voltage regulator of this invention includes basically five component parts which namely are a voltage reference bridge 54, a chopper circuit 56, an A.C. amplifier circuit 58, a demodulator circuit 60 and a power output circuit which is generally designated by reference numeral 62. The power output circuit 62 includes a magnetic amplifier and silicon controlled rectifiers which are connected in a manner to be more fully described hereinafter.

The voltage reference bridge has an input circuit which includes conductors 64 and 66. The conductor 64 is connected with a junction 68 on the lead wire 70. The lead wire 70 is connected with junction 36 through an ignition switch 72. The lead wire 70 thus is connected to the positive side of the bridge rectifier 30 when the ignition switch 72 is closed. The lead wire 70 thus under normal operating conditions is at a positive potential. The other input conductor 66 for the voltage reference bridge and for the other component parts of the regulator is grounded and thus is at a negative potential. In other words, the conductor 66 is at the same potential as the negative side of bridge rectifier 30.

The lead wire 64 is connected with a junction 74 which supplies a positive potential to the lead wire 76. A resistor 78 and a Zener diode 80 are connected between lead wires 66 and 76 and therefore are connected essentially across the output terminals of the bridge rectifier 30. A voltage divider network comprised of resistor 82, potentiometer resistor 84, battery temperature sensing resistor 86 and a positive temperature coefficient resistor 88 are connected across the lead wires 76 and 66. The resistor 86 is not required but where it is used, it will vary its resistance with varying temperature of the battery 34. This resistor may be of any well-known type that changes its resistance in accordance with changes in temperature.

It will be appreciated that the components just described form a bridge network which is fed from the D.C. output terminals of bridge network rectifier 30 and which has D.C. output terminals 90 and 92. The voltage appearing between junctions 90 and 92 is an error voltage and is an indication that the actual output voltage of bridge rectifier 30 is either higher or lower than the desired regulated value. When the output voltage of bridge rectifier 30 just equals the desired regulated value, there is no voltage appearing between junctions 90 and 92.

The purpose of the chopper circuit 56 is to provide an A.C. output voltage from the D.C. error signal appearing between junctions 90 and 92 of the voltage reference bridge. This chopper circuit includes a pair of NPN transistors 94 and 96. The error signal is fed into the chopper circuit from the voltage reference bridge at junctions 98 and 100. The chopper circuit has an A.C. input provided by a transformer 101 having a primary winding 102 and a secondary winding 104. The primary winding 102 is fed from lead wires 106 and 108 which are connected with junctions 109 and 111. The lead wires 106 and 108 thus are fed from one phase of the output winding 28 and this phase therefore feeds the primary winding 102 of transformer 101. The secondary winding 104 has one side which is connected with the base electrodes of transistors 94 and 96 through resistors. The opposite side of the secondary winding 104 is connected with the collector electrodes of transistors 94 and 96. The emitter electrode of transistor 94 is connected with junction 98 whereas the emitter electrode of transistor 96 is connected with junction 100.

As noted hereinbefore, the chopper circuit 56 provides an A.C. output from the D.C. input coming from the voltage reference bridge and this A.C. output is controlled by the D.C. input to the chopper.

The A.C. output voltage of the chopper 56 is fed to the input of an A.C. amplifier 58. The A.C. amplifier 58 is comprised in part of NPN transistors 110, 112 and 114. The transistor 110 is coupled to the output of the chopper circuit 56 by a plurality of resistors and capacitors which are not identified by reference numerals. The output of transistor 110 feeds the input of transistor 112 through resistors and capacitors and in a similar fashion the output of transistor 112 feeds the input of transistor 114. The output of transistor 114 is fed to the primary winding 116 of a transformer 118. The transformer 118 has a center tapped secondary winding 120 which provides one of the inputs for the demodulator circuit 60.

The demodulator circuit 60 has another A.C. input which is provided by the transformer 122. The transformer 122 has a primary winding 124 and center tapped secondary windings 126 and 128. The primary winding 124 is fed from lead wires 46 and 48 which are the same lead wires that feed the primary winding 102 for the A.C. input to the chopper 56. The secondary winding 126 has its center tap connected to one end of secondary winding 120 via the lead wire 130. The opposite ends of secondary winding 126 are connected respectively with diodes 132 and 134, the diode 134 being connected with lead wire 136. The diode 132 is connected with junction 138 which in turn is connected with lead wire 140.

The center tap of secondary winding 128 is connected to an opposite end of secondary winding 120 via lead wire 142. The diode 144 connects one end of secondary winding 128 with lead wire 136 whereas the diode 146 connects the opposite end of secondary winding 128 with junction 138. A lead wire 148 connects the junction 138 with one side of diode 132.

The centre tap of secondary winding 120 is connected with a junction 150 located between resistors 152 and 154. The series resistors 152 and 154 connect the lead wires 136 and 156. A capacitor 157 is also connected between lead wires 136 and 156.

It is seen that lead wire 156 is connected with a junction 158 (FIGURE 1B) whereas lead wire 136 is connected to one side of a capacitor 160. A resistor 162 is connected to one side of the capacitor, the opposite end of this resistor being connected with junction 164 through a lead wire 166. The junctions 158 and 164 are located on opposite sides of resistor 168 which is connected between junctions 92 and 98. The capacitor 160 and the resistor 162 provide a negative feedback between the demodulator and the junctions 158 and 164.

The demodulator has a D.C. output which is taken across lead wires 136 and 156. The demodulator circuit compares the output from the A.C. amplifier 58 with the output of primary winding 124 and then provides a D.C. error signal which is used to control the power output circuit 62 of the regulator.

The power output circuit of the regulator includes a magnetic amplifier 170. This magnetic amplifier has the usual two magnetic cores which carry gate or load windings 172 and 174, a control winding 176 and a voltage feedback winding 178. The control winding 176 and feedback winding 178 are common to both magnetic cores so that the saturation of the core is controlled by current flowing in the control winding 176 and in the voltage feedback winding 178. It can be seen that the output voltage of the demodulator 60 is supplied to the control winding 176 of the magnetic amplifier 170 through a resistor.

The magnetic amplifier 170 is used to supply gate voltages to a pair of silicon controlled rectifiers 180 and 182. It is seen that the anode of controlled rectifier 180 is connected to one side of center tapped secondary winding 184 of transformer 186. Transformer 186 has a primary winding 188 which is fed from junctions 50 and 52 and thus is fed from one phase of the output winding 28. The center tap of secondary winding 184 is connected with junctions 44 and 190. The junction 190 is connected to one side of the voltage feedback winding 178 of the magnetic amplifier, the opposite side of this winding being connected with junction 192 through resistor 194.

One side of the secondary winding 184 is connected in series with the gate winding 172 which is connected with junction 200 through a diode 202. The junction 200 is connected with the gate electrode of controlled rectifier 180. A resistor 203 is connected between junction 200 and the lead wire 204. The cathode of controlled rectifier 180 is connected with lead wire 204 as is clearly apparent from the drawing.

The anode of controlled rectifier 182 is connected with junction 208 which in turn is connected to one side of gate winding 174 and one side of secondary winding 184. A diode 210 connects the gate winding 174 with junction 212. The junction 212 is connected with the gate electrode of controlled rectifier 182 and this junction is connected with lead wire 204 through resistor 214.

The transformer 186 has another center tapped output winding 220 which may be termed a tertiary winding. The opposite ends of output winding 220 are connected with junction 222 through diodes 224 and 226. The center tap of winding 220 is connected with junction 192. The junction 222 is connected with junction 223 through lead wire 225. A resistor 228 connects the junctions 42 and 223. A diode 230 connects junctions 42 and 44. Another diode 232 connects the junction 223 with the lead wire 70 which is connected with the positive side of bridge rectifier 30 when ignition switch 72 is closed.

It is seen that the positive field conductor 40 is connected with junction 42 and that the negative field conductor 38 is connected with junction 44. The junctions 42 and 44 will thus feed the field winding 16 of the exciter generator 12.

The operation of the voltage regulator in regulating the output voltage of the dynamoelectric machine 10 will now be described. In this description, the initial energizing circuit for the field winding 16 will be described first.

When it is desired to supply initial energizing current to the field winding 16, the ignition switch 72 is closed. A circuit for initially energizing the field winding 16 can now be traced from junction 36, through the closed ignition switch 72, through lead wire 70, through diode 232, through resistor 228, through lead wire 40, and the through the field winding 16 to ground. With the field winding 16 being energized and the dynamoelectric machine being rotated by a power source, an output voltage will be developed by both the exciter generator 12 and the main generator 14. The A.C. output voltage which appars between leads 46 and 48 is applied to primary winding 188 of transformer 186 which causes an output voltage to appear across winding 220. This voltage is rectified by diodes 224 and 226 and a D.C. potential is developed which is positive at junction 223 and negative at junction 42. This potential is developed across the resistor 228 and is of such a polarity as to oppose the current being supplied to the field winding 16 from lead wire 70. In other words, the output voltage of diodes 224 and 226 is used to oppose the energization of the field winding from the circuit that includes lead wire 70 and diode 232. With this arrangement, the energizing current from the field winding from junction 36 cannot force the generator completely out of control and the effect of this current is virtually eliminated once the generator 28 comes up to its desired regulated output voltage.

After the generator 28 has built up to its desired regulated voltage, the voltage regulator will control the field current for the field winding 16. If the desired regulated voltage of bridge rectifier 30 is 28 volts and the actual voltage is, for example, 30 volts, an error signal will appear between junctions 90 and 92 of the voltage reference bridge. This voltage will be converted into an A.C. signal by the chopper circuit 56 and this A.C. signal will be amplified by the A.C. amplifier 58. This A.C. voltage from the A.C. amplifier is then fed to the demodulator 60 together with an A.C. signal from lead wires 46 and 48 and the demodulator then provides a D.C. error signal from the two A.C. inputs which is applied to the control winding 176 of magnetic amplifier 170.

The signal applied to the control winding 176 is of such a character as to cause the current to be reduced in the field winding 16 if the output voltage is too high. In this connection, it will be appreciated that the gate windings of the magnetic amplifier 170 control the gate voltage for controlled rectifiers 180 and 182. Thus, the signal coming from the demodulator will eventually cause a saturation of the magnetic amplifier core depending upon the magnitude of the signal. When the magnetic core saturates the potential of junctions 200 and 212 will increase to cause the controlled rectifiers 180 and 182 to become conductive in their anode-cathode circuits. The controlled rectifiers are connected in such a manner with the center tapped secondary winding 184 as to provide full wave current or a full wave voltage between junctions 42 and 44. This full wave current is supplied to the field winding 16 and the amount of this current is determined by the relative "on" and "off" times of the controlled rectifiers 180 and 182.

It will be appreciated that where the output voltage of bridge rectifier 30 is too high, for example where it is 30 volts when it should be 28 volts, the "on" time of the controlled rectifiers 180 and 182 is reduced to therefore reduce field current for the field winding 16. On the other hand, if the output voltage of bridge rectifier 30 were lower than 28 volts, the time of conduction of controlled rectifiers 180 and 182 would be increased to increase the field current for field winding 16.

In summary, it can be seen that field current for the field winding 16 is supplied from a phase winding of output winding 28 and is controlled by the controlled rectifiers 180 and 182. The conduction of controlled rectifiers 180 and 182 is controlled by the magnetic amplifier 170 which receives its control signal from the demodulator 60. The demodulator receives its signal from the A.C. amplifier 58 which in turn receives signals from chopper 56 and the voltage reference bridge 54.

If either controlled rectifier 180 or 182 should fail by an open circuit between the anode and cathode, there will be no uncontrolled voltage applied to the field winding 16. On the other hand, should either controlled rectifier 180 or 182 fail by shorting, an A.C. voltage is applied to field winding 16 so that the generator is prevented from building up to an abnormal voltage that might destroy the electrical loads supplied by this system. It can be seen from the foregoing that no resistive coupled D.C. amplifiers are used in the regulator which is a fail-safe feature. Thus, if any transistor should fail in either the chopper or the A.C. amplifier, the amplifier would have a zero output and the field winding 16 would therefore not be supplied with current.

While the embodiment of the present invention as herein disclosed constitutes a preferred form, it is to be understood that other forms might be adopted.

What is claimed is as follows:

1. In combination, a dynamoelectric machine having a control winding and an A.C. output winding, first rectifier means connected with said output winding for converting the A.C. output of said output winding to direct current, a battery connected with said first rectifier means, a manually operable switch, a circuit for initially energizing said control winding connected between said battery and said control winding and including said manually operable switch, and a circuit energized from said A.C. output winding and including second rectifier means operable to develop a current which opposes the current supplied to said control winding from said battery when said output winding has a predetermined output voltage.

2. In combination, a dynamoelectric machine having a control winding and an A.C. output winding, a transformer having a primary winding connected with said A.C. output winding and having a secondary winding and a tertiary winding, first rectifier means connected with said output winding for supplying charging current to a battery, a manually operable switch, an energizing circuit for energizing said control winding from said battery including said manually operable switch, second rectifier means connected with said tertiary winding for providing a current that opposes the current supplied to said control winding by said battery, at least one controlled rectifier connected with said secondary winding for supplying a controlled direct current to said control winding, voltage sensing means connected with the output of said first rectifier means, and means connected between said voltage sensing means and said controlled rectifier for controlling its conduction in accordance with the D.C. output voltage of said first rectifier means.

3. In combination, a dynamoelectric machine having a control winding and an A.C. output winding, first rectifier means connected with said A.C. output winding, a battery connected across the D.C. output terminals of said first rectifier means, a transformer having a primary winding connected with said A.C. output winding and having secondary and tertiary windings, a manually operable switch, a circuit for initially energizing said control winding from said battery including said manually operable switch, second rectifier means connected with said tertiary winding and with said control winding for supplying a direct current that opposes the current supplied to said control winding from said battery, control means connected with said secondary winding and with said control winding for supplying a controlled D.C. current to said control winding, and means for controlling said control means in accordance with the output voltage of said first rectifier means.

4. A voltage regulator comprising, a pair of D.C. input terminals, a pair of A.C. input terminals and a pair of D.C. output terminals, a voltage sensing circuit connected with said D.C. input terminals having a D.C. output, a chopper circuit connected with the output of said voltage sensing means and with said A.C. input terminals, an A.C. amplifier having an input connected with the output of said chopper circuit, a demodulator having an input connected with the output of said A.C. amplifier and connected with said A.C. input terminals, magnetic amplifier means, means connecting the output of said demodulator with said magnetic amplifier means, at least one controlled rectifier, means connecting said magnetic amplifier with said A.C. input terminals and said controlled rectifier, and means connecting said controlled rectifier between said A.C. input terminals and said D.C. output terminals.

5. The combination according to claim 4 wherein the voltage sensing means includes a voltage reference bridge.

6. The combination according to claim 4 wherein the magnetic amplifier means has at least one gate winding which controls the gate voltage of the controlled rectifier.

References Cited by the Examiner
UNITED STATES PATENTS

| | | | |
|---|---|---|---|
| 2,717,352 | 10/1955 | Ribner | 322—36 |
| 2,930,984 | 3/1960 | Ford | 330—9 |
| 2,987,666 | 6/1961 | Manteuffel | 323—58 |
| 3,032,701 | 5/1962 | Krausz | 322—73 |
| 3,086,161 | 4/1963 | Carbo et al. | 322—11 |

MILTON O. HIRSHFIELD, *Primary Examiner.*

LLOYD McCOLLUM, *Examiner.*

A. H. TISCHER, J. J. SWARTZ, *Assistant Examiners.*